United States Patent [19]

Ferguson

[11] Patent Number: 5,246,248
[45] Date of Patent: Sep. 21, 1993

[54] VEHICLE REAR SUSPENSION APPARATUS

[75] Inventor: Michael A. Ferguson, Okemos, Mich.

[73] Assignee: General Motors Corporation, Detroit, Mich.

[21] Appl. No.: 883,744

[22] Filed: May 15, 1992

[51] Int. Cl.⁵ .............................. F16F 1/38
[52] U.S. Cl. .................. 280/717; 280/688; 267/281; 267/141.3
[58] Field of Search .......... 280/723, 717, 716, 690, 280/688; 267/141.2, 141.3, 141.7, 280, 281, 293, 154, 153

[56] References Cited

U.S. PATENT DOCUMENTS

| 4,260,177 | 4/1981 | Pflughaupt et al. | 267/153 |
| 4,589,677 | 5/1986 | Matschinsky | 280/716 |
| 4,634,108 | 1/1987 | Munch | 267/279 |
| 4,834,416 | 5/1989 | Shimoe et al. | 280/717 |
| 4,889,328 | 12/1989 | Uno et al. | 267/141.2 |

FOREIGN PATENT DOCUMENTS

| 3243981 | 5/1984 | Fed. Rep. of Germany | 267/281 |
| 2564785 | 11/1985 | France | 280/688 |
| 2008714A | 6/1979 | United Kingdom . | |
| 2033533A | 5/1980 | United Kingdom . | |

*Primary Examiner*—Karin L. Tyson
*Attorney, Agent, or Firm*—Dean L. Ellis

[57] ABSTRACT

Vehicle suspension of the type including trailing arm axle with cross-beam includes steer-control bushings connecting the forward ends of the axle trailing arms to the vehicle body, the bushings having rigid steer-control elements molded in situ within the elastomeric element of the bushing.

3 Claims, 2 Drawing Sheets

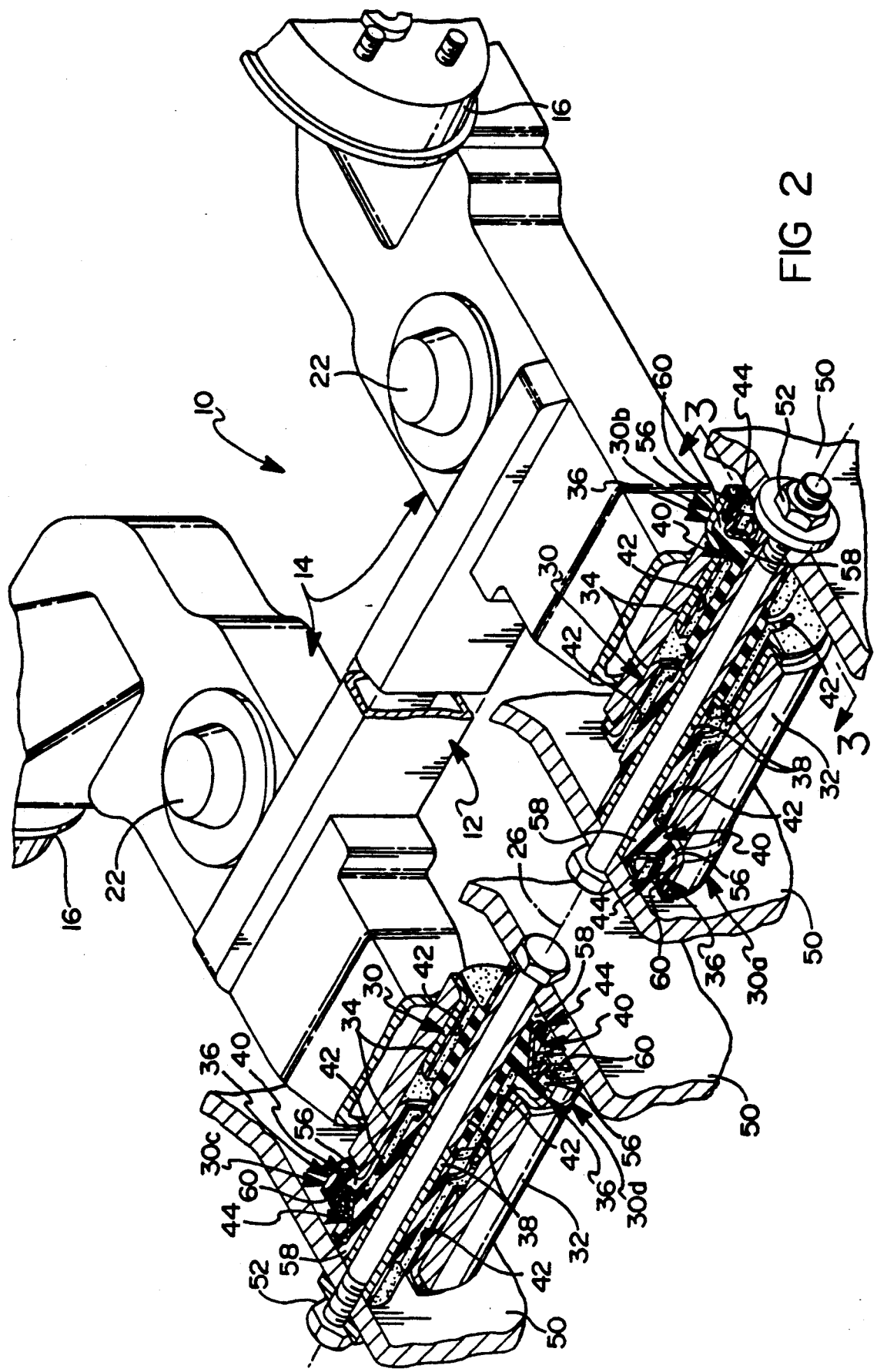

VEHICLE REAR SUSPENSION APPARATUS

The invention relates to vehicle suspension apparatus and more particularly to an automotive axle suspension incorporating resilient bushings which interconnect elements of the axle with the vehicle body superstructure.

Suspensions that include such bushings are typically designed to enable the bushings to accommodate by internal flexure the various vertical ride displacements that occur between axle and body but also to accommodate impacts on the axle transmitted into the body longitudinally thereof, i.e., a degree of shock isolation partaking of the compliance and damping characteristics of their elastomeric material. Necessarily, such suspension design has been an art of compromise in that maximum utilization of those shock isolation and ride motion compliance capabilities in the bushings can also lead to large freedom of angulation or "steer" compliance arising from lateral acceleration forces applied to the bushing parts, with concomitant angulation between the axle and vehicle superstructure in its plan view. For example, if it is desired that during cornering a particular vehicle rear axle exhibit little or no oversteer tendency through such bushing compliance, then the bushing may have reduced performance in, inter alia, longitudinal impact absorption.

BRIEF DESCRIPTION OF THE PRIOR ART

In British Patents GB 2008714 and 2033533, particularly the final embodiment in the latter, axle and bushing combinations are described wherein structural modifications to the bushing, while maintaining satisfactory shock isolation, utilize lateral acceleration forces on the axle to load one portion of the elastomer material in a manner to reduce oversteer response between axle and vehicle body. However, for ride motion and shock isolation, the shape and thickness of the elastomer remains large or is made even larger and undesirably the result of the modifications is a bulkier bushing, or one wherein the elastomer in diametrically distal regions of the bushing undergoes undesirably large displacement and shear strain to accommodate normal ride motions of the axle.

BRIEF DESCRIPTION OF THE INVENTION

The present invention provides an improved vehicle suspension incorporating steer properties but minimizing the overall size of bushings and any critical elastomer shear strain regions thereof as occur in the prior art, yet which maintain satisfactory shock isolation and allow even larger accomplishments in steer performance, thereby to reduce conflict in the goals of the suspension design.

Specifically, the invention incorporates in such suspension for rear axle or the like a set of bushings which connect axle to body and which avoid internal structural features that tend to unduly enlarge the overall bushing size. Rather, within the elastomer body of the bushing, there is in situ molded a steer-control rigid member that is adapted to utilize lateral displacement between axle and body, and between respective bushing parts, to create properly directed steer reaction forces.

Thus, this steer-control function proceeds without principal participation of the elastomer, as characterized in the prior art, so that not only is bushing compactness improved but so to is overall steer performance.

These and other objects, features and advantages of the invention will be readily apparent from the following specification and from the drawings wherein:

FIG. 2 is an enlarged view, partially broken away, of a portion of FIG. 1;

Figure 1:
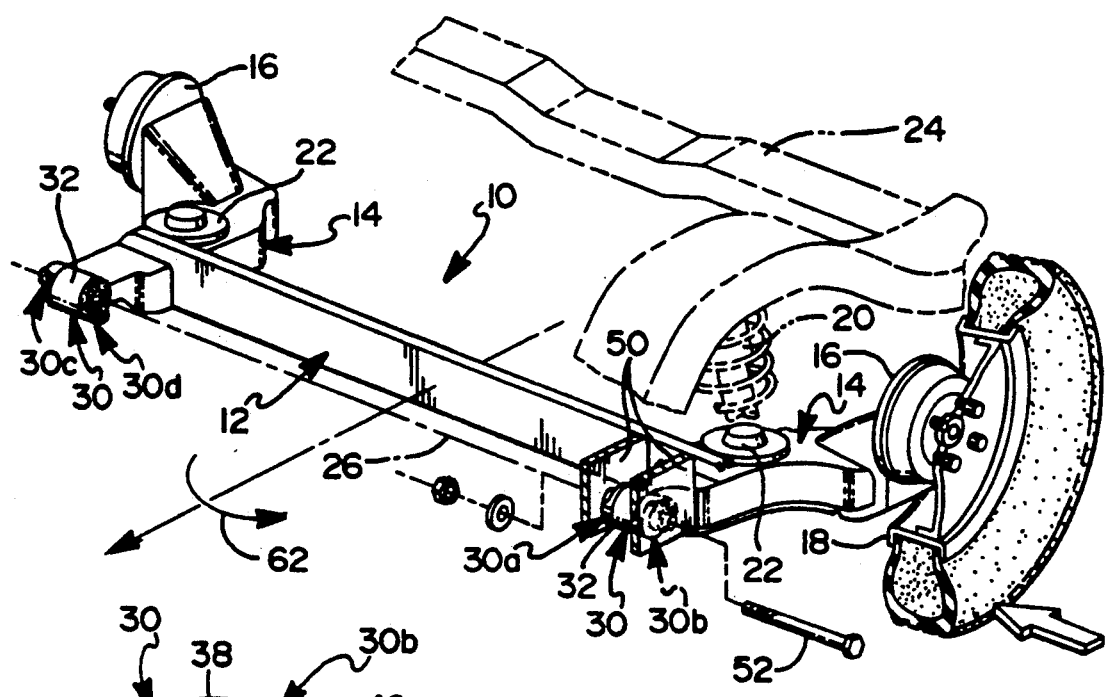
FIG. 1 is a fragmentary perspective view, partially broken away, of a rear suspension apparatus for an automotive vehicle incorporating the present invention.

Referring now to FIG. 1, the same illustrates an automotive vehicle rear suspension apparatus including a rear axle 10 generally of the trailing arm type and including a transverse twist beam 12 which is welded either end with a rearwardly extending trailing arm 14 intermediate the ends of the latter. Wheel hubs 16 carried at the rearward ends of the arms 14 each carry a wheel and tire unit 18, and conventional spring and hydraulic strut units 20 are placed between spring seats 22 on arms 14 and counterpart seating locations or towers of the vehicle body superstructure which is indicated in phantom at 24.

Thus, axle 10 with its wheels and tires 18 are adapted to displace relative to body 24 about respective forward ends of the arms 14, which are interconnected on the body on a common transverse axis 26 by resilient bushings adapted to accommodate such rotation therebetween in normal even-sided ride motions or in uneven, wheel jounce/rebound occurrences at the opposite sides of the axle. Further, longitudinal road impacts on the wheels arising from chuckholes, tar strips, etc. are partially absorbed in the resilient bushings for a degree of shock isolation in that longitudinal direction.

Figure 3:
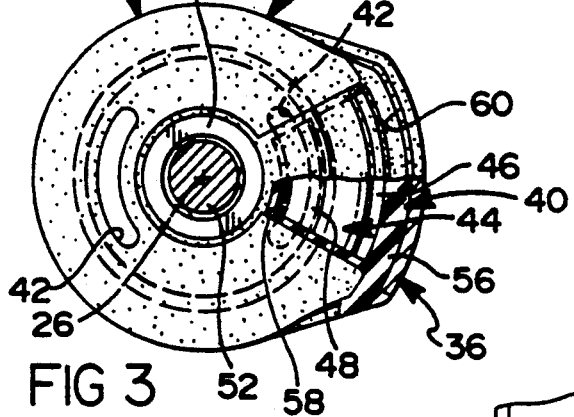
FIG. 3 is a view taken along the plane indicated by lines 3—3 of FIG. 2.

In accordance with the present invention, the bushings, designated 30, serve for such functions as well as for steer-control properties arising during vehicle cornering or lateral acceleration, and consequent displacement tendency between the axle and body 24 along axis 26. Referring also to FIG. 2, the interconnecting assembly includes, in one embodiment, a bushing combination including at each arm 14 a pair of individual bushings 30a and 30b, and 30c–30d, abutted end-to-end on axis 26. It will be appreciated as the description proceeds that all four illustrated bushings are identical and further that rather than all four, only a single bushing 30 may be utilized at each arm in other embodiments with similar results. The forward end of each arm 14 incorporates a cylindrical seat of rigid material, designated at 32. Bushings 30 are press fitted tightly within each seat 32, specifically an anti-rotation press fit between the interior surface of such seat and an outer generally cylindrical element 34 of each bushing 30. As will be explained, such generally cylindrical conformation of element 34 is interrupted in one segment or region of each bushing as at 36, over approximately 60 degrees, to incorporate in situ molding of a rigid steer-control member. Referring also to FIG. 3, each bushing incorporates an inner cylindrical element sleeve also of rigid material such as steel, and designated 38. An elastomer body 40, such as butyl or other rubber, intervenes sleeve 38 and outer sleeve 34 and is securely bonded throughout its length to both thereof. The elastomer is of a durometer and thickness throughout the length of bushing 30 to accomplish the desired amounts of fore/aft shock isolation or softness as well as moderate flexure in ride and other vertical axle displacement. Voids indicated at 42 may contribute to such properties.

Figure 4:
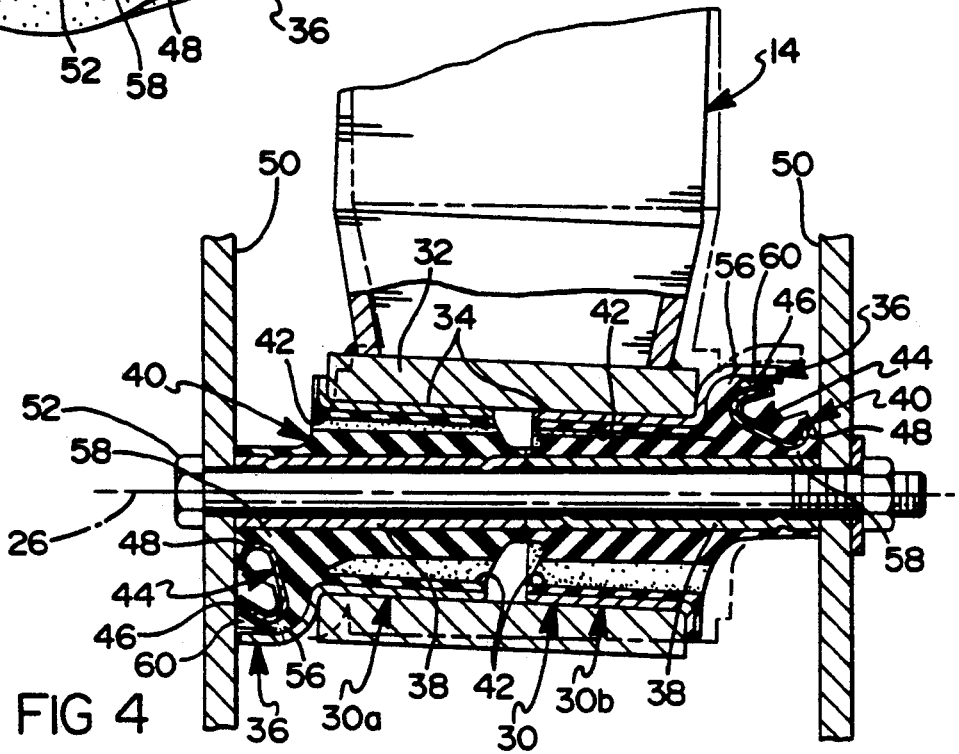
FIG. 4 is a plan view, partially broken away, of a portion of FIG. 1.

In region 36, a steer-control member 44 of stamped metal is molded in situ within the elastomer and extends in a segmental shape through such region. As indicated in FIGS. 3 and 4, in cross-section, member 44 is of generally channel or C shape with turned flanges 46 and 48 serving to define stiff corners.

With the bushings 30 seated in each seat 32 against rotation, axle 10 is interconnected with the body 24 by placement of the seats respectively between opposite pairs of bracket walls 50 which depend from body 24. A bolt fastener assembly 52 then compressively secures the interconnection through reception of the bolt within each sleeve 38 of bushings 30 and tightening the latter endwise anti-rotatively against each other and the inner surfaces of walls 50 by torquing a fastener nut over an outer washer. Thus, metal-to-metal displacement is prevented and all motions above-described must proceed through elastomer flexure solely.

Referring to FIG. 2, member 44 is purposefully oriented when molded within elastomer 40 to present the flange 48 closely proximate a bracket wall 50 when the bushing is installed. The peripheral wide flange 46 is molded closely proximate the enlarged region of outer sleeve 34. Adjacent either of these ends or corners of the anti-steer member, layers of elastomer intervene the member and the inner and outer sleeves 38 and 34 respectively. These layers, designated at 56 and 58, are each relatively thin in comparison with the remainder of the elastomer body toward the other end of the bushing 30. Also, additional voids 60 may be provided in the region of members 44 for additional shock isolation and added compliance in regions 36.

In operation, the considerable thickness in each bushing 30 of the elastomer body 40, together with whatever voids 42, etc. that are selected, provide a requisite amount of rotary compliance necessary to relative vertical displacement between axle and body, as well as appropriate impact or shock isolation longitudinally of the vehicle. However, the invention also comprehends the steer compliance tendencies that arise from the elastomer body. Referring to FIG. 1, for example, when the vehicle negotiates a right turn, a road reaction force typically occurs, as indicated by the arrow at the wheel and tire 18, which induces relative lateral displacement between axle 10 and the body in the direction of that arrow. Concomitantly, the tire patch force illustrated ordinarily induces a moment on axle 10 through bushings 30 tending to displace their elastomers and relatively rotate the axle counterclockwise in the direction of arrow 62 of that Figure, in an oversteer mode.

However, in the present invention, steer-control members 44 counteract that oversteer tendency. Referring to FIG. 4 and the arm 14 of the vehicle left side, these members 44 utilize the lateral displacement in the bushing parts to induce, instead, a clockwise relative rotation between the axle and body. The corners at flanges 46 and 48 of member 44 of bushing 30a, proximate leftward bracket wall 50, serve as reaction points through the adjacent thin layers of elastomer to utilize the lateral displacement to induce conjoint displacement, longitudinally forward of the vehicle in region 36. Meanwhile, in bushing 30b, its member 44 and adjacent thin layers of elastomer bonded to sleeves 34 and 38 are displaced into tension in the region 36 thereof to further induce such conjoint displacement. Thus, as the elastomer body 40 deflects laterally through its thicker regions, members 44 act as internal pivotable links or levers of rigid nature adjoined with thin layers of elastomer to utilize the external steer forces to properly direct the reaction forces in the interconnecting means of bracket wall 50 and outer sleeve 34 etc. The participation of thick regions of elastomer for this result is minimized. The result, specifically, is a tendency toward a bodily rotation in gross of the outer sleeve 34, seat 32, and axle 10 from their broken-line normal orientation that exists absent any lateral force, into an orientation illustrated in solid lines in FIG. 4 which actually represents an understeer mode for the axle. The extent to which such orientation occurs will be the result of a number of design factors including elastomer durometer, thickness both nominally and in regions 36, normal orientation of members 44 and other factors regularly known to the skilled designer that are peculiar to various suspensions.

With respect to the normal orientation of members 44, as molded, relative the vehicle longitudinal axis, it will be appreciated that the lateral acceleration forces described will generally resolve themselves at regions 36 into force vectors that are angulated roughly similar to the illustrated orientation of such members. For the members to accomplish their result, their normal orientation need be more parallel with the longitudinal center line than such force vectors, so that reaction forces will indeed induce the linkage like pivoting described.

It will further be appreciated, referring to FIG. 2, that the bushings 30c–d at the vehicle right side contribute identically in the right hand turn described, with member 44 of bushing 30c inducing the under-steer property while in compression and the opposite member 44 of that combination in bushing 30d operating in tension. For a left turn situation, not shown, an understeer tendency arises as the bushings are forced rightwardly and members 44 of bushings 30b and 30d pivot while in a compression situation and corresponding inducement of tension in members 44 of bushings 30a and 30c occurs.

It will be seen that rather than bushing pairs at each side of the axle in respective arms 14, a singular bushing 30 may be utilized where one member 44 at one arm 14 is placed in compression and pivots from reaction forces, while at the other side of the vehicle a singular member 44 in that bushing acts in tension.

In any case, the steer properties are derived in a bushing which retains compactness of elastomer body in its thicker regions tailored just to the ride flexure and longitudinal shock isolation required and where, as seen in FIG. 3, only segment regions 36 are enlarged but even there the intervening elastomer layers do not exhibit the thickness that such flexure and isolation objectives would normally dictate. Thus, overall compactness and packaging attributes for these bushings are improved.

The embodiments of the invention in which an exclusive property or privilege is claimed are defined as follows:

1. Wheel suspension apparatus for a vehicle, comprising,
    an axle,
    and means interconnecting the axle with the vehicle superstructure which means include a resilient bushing,
    said bushing comprising generally concentric inner and outer rigid elements connected one to a portion of the axle and the other to a portion of the superstructure, an elastomeric body bonded to said inner and outer elements, and rigid link means in situ molded within the elastomeric body with layers of elastomer intervening said rigid link means and said inner and outer elements, said link means being oriented, as viewed in longitudinal cross-section of said bushing, with the longitudinal axis of said link means at an acute angle relative the concentricity axis of the bushing so that, under forces causing in a plane lateral displacement between said inner and outer elements, said rigid link means sustains and directs reaction forces through said interconnecting means operative to induce in said plane predetermined relative rotation between the axle and superstructure.

2. The apparatus recited in claim 1 wherein said rigid link means comprises a member of generally segmental shape.

3. Wheel suspension apparatus for a vehicle, comprising,
an axle,
and means interconnecting the axle with the vehicle superstructure which means include a resilient bushing,
said bushing comprising generally concentric inner and outer rigid elements connected one to a portion of the axle and the other to a portion of the superstructure, an intervening elastomeric body bonded to said elements, and a rigid link member in situ molded within the elastomeric body adjacent one end of the bushing with a layer of elastomer separating said member and either of said elements, said link member being of segmental shape and being oriented, as viewed in longitudinal cross-section of said bushing, with the longitudinal axis of said link member at an acute angle relative the concentricity axis of the bushing, said elastomer layers being substantially thin in relation to the thickness of elastomer remaining toward the other end of said bushing, whereby under forces causing in a plane lateral displacement between said inner and outer elements said link member sustains and directs reaction forces through said interconnecting means operative to induce in said plane rotation of said link member and predetermined relative rotation between the axle and superstructure.

* * * * *